(12) United States Patent
Yoshitsugi et al.

(10) Patent No.: US 8,404,087 B2
(45) Date of Patent: Mar. 26, 2013

(54) PROCESS FOR PRODUCING ELECTRET COARSE POWDER

(75) Inventors: Tomotika Yoshitsugi, Osaka (JP); Hiroshi Inoue, Osaka (JP)

(73) Assignee: Sakura Color Products Corporation, Osaka-shi, Osaka (JP)

(*) Notice: Subject to any disclaimer, the term of this patent is extended or adjusted under 35 U.S.C. 154(b) by 530 days.

(21) Appl. No.: 12/718,269

(22) Filed: Mar. 5, 2010

(65) Prior Publication Data

US 2011/0198224 A1    Aug. 18, 2011

(30) Foreign Application Priority Data

Feb. 17, 2010   (JP) .................................. 2010-32868

(51) Int. Cl.
   *B01J 19/08* (2006.01)
(52) U.S. Cl. .................................. 204/157.63
(58) Field of Classification Search ............. 204/157.63
   See application file for complete search history.

(56) References Cited

U.S. PATENT DOCUMENTS

2011/0000786 A1*  1/2011  Inoue et al. ................... 204/450

FOREIGN PATENT DOCUMENTS

| EP | 1016942 A2 | 7/2000 |
|----|------------|--------|
| GB | 1368454 A | 9/1974 |
| JP | 4-327207 A | 11/1992 |
| JP | 2005-031189 A | 2/2005 |
| JP | 2005-154705 A | 6/2005 |
| JP | 2007-102148 A | 4/2007 |

OTHER PUBLICATIONS

European Search Report, issued Jun. 4, 2010 for corresponding European Patent Application No. 10002371.2.

* cited by examiner

*Primary Examiner* — Kishor Mayekar
(74) *Attorney, Agent, or Firm* — Westerman, Hattori, Daniels & Adrian, LLP

(57) ABSTRACT

The subject invention provides a process for efficiently producing electret coarse powder useful as electrophoretic particles for a large-screen display.

The process for producing electret coarse powder comprises irradiating a fluorine-containing resin sheet with an electron beam or a radial ray to convert the fluorine-containing resin sheet into an electret sheet, and pulverizing the electret sheet.

8 Claims, 1 Drawing Sheet

PROCESS FOR PRODUCING ELECTRET COARSE POWDER

TECHNICAL FIELD

The present invention relates to a process for producing electret coarse powder useful as electrophoretic particles for a full-color electrophoretic display apparatus (so-called "electronic paper").

BACKGROUND ART

In recent years, the electrophoretic display method, which employs the electrophoresis of charged particles (electret particles), has been attracting attention as the most promising technology for a next-generation display apparatus. However, this technology still has many problems including the shape of charged particles, small and unstable charge potential ($\zeta$ potential), secondary aggregation or sedimentation of electrophoretic particles, inadequate deletion of previously displayed images, unsatisfactory response speed, and the like.

Patent Literatures 1 and 2 disclose electret powders used for the above purpose.

Patent Literature 1 discloses negatively-charged fine particles, which are formed by adding a resin serving as an electron trap to each core resin of spherical ultrafine particles of 1 to 10 μm in diameter produced by polymerizing a polymeric fine particle material, and irradiating the spherical ultrafine particles with a 10-300 kGy electron beam to obtain electret particles, wherein the core resins are colored with an arbitrary color (claim 1).

Patent Literature 2 discloses use of negatively-charged color particles, which are formed by adding pigment, a material serving as an electron trap, etc., to a polymeric fine particle monomer material to form spherical ultrafine particles of 5 to 10 μm in diameter by way of suspension polymerization, emulsification polymerization, dispersion polymerization or the like, and irradiating the ultrafine particles with a 10-50 kGy electron beam before heating the particles at 90° C. to 110° C. for ten and several minutes or irradiating the ultrafine particles with a 10-50 kGy electron beam at 90° C. to 100° C., thereby obtaining negatively-charged electret fine particles, wherein the particles have −50 to −100 mV $\zeta$ potential, and are colored with an arbitrary color (claim 10).

However, when these electret particles prepared by conventional polymerization methods are used as the electrophoretic particles for a large-screen display, their particle size is too small for the large display and can be a disadvantage. For example, when such small particles are used to carry out image display, the image is displayed in the form of dots, and there is a possibility that the particles have gaps therebetween on the screen. For this reason, coarse powder is more suitable than fine particles as the electrophoretic particles for use in a large display. However, coarse powder that ensures a desirable response performance has not been developed yet.

Therefore, there has been a demand for the development of a method for efficiently producing electret coarse powder useful as the electrophoretic particles for a large display.

CITATION LIST

Patent Literature

[PTL 1] Japanese Unexamined Patent Publication No. 2005-154705

[PTL 2] Japanese Unexamined Patent Publication No. 2007-102148

SUMMARY OF THE INVENTION

Technical Problem

An object of the present invention is to provide a method for producing electret coarse powder that is useful as the electrophoretic particles for a large display.

Technical Solution

The inventor of the present invention conducted extensive research to solve the foregoing problems, and found that the above object can be achieved by a method of converting a fluorine-containing resin sheet into an electret sheet and then pulverizing the sheet to obtain electret coarse powder. With this finding, the inventors completed the present invention.

Specifically, the present invention relates to the following methods of producing electret coarse powder.

Item 1. A process for producing electret coarse powder, comprising irradiating a fluorine-containing resin sheet with an electron beam or a radial ray to convert the fluorine-containing resin sheet into an electret sheet, and pulverizing the electret sheet.

Item 2. The process according to Item 1, wherein the fluorine-containing resin sheet is at least one member selected from the group consisting of a tetrafluoroethylene-hexafluoropropylene copolymer sheet (FEP), tetrafluoroethylene-perfluoroalkylvinylether copolymer sheet (PFA) and polytetrafluoroethylene sheet (PTFE).

Item 3. The process according to Item 1 or 2, wherein the electret coarse powder has a mean particle diameter of from 0.5 to 3 mm.

Item 4. The process according to any one of Items 1 to 3, wherein the electret coarse powder contains a pigment.

Item 5. Electret coarse powder produced by the process according to any one of Items 1 to 4.

Item 6. An electrophoresis method comprising disposing the electret coarse powder according to Item 5 between electrodes in the air, and applying an external voltage between the electrodes.

Item 7. An electrophoresis method comprising disposing the electret coarse powder according to Item 5 between electrodes in silicone oil, and applying an external voltage between the electrodes.

The process for producing the electret coarse powder according to the present invention is described in detail below.

The process for producing the electret coarse powder according to the present invention comprises irradiating a fluorine-containing resin sheet with an electron beam or a radial ray to convert the sheet into an electret sheet, and pulverizing the electret sheet.

This method is particularly characterized by the conversion of the fluorine-containing resin sheet into an electret sheet before pulverizing the sheet, thereby efficiently producing coarse powder of a desirable size having a uniform electret property. Particularly, irradiation not only converts the sheet into an electret sheet but also makes the sheet fragile, i.e., easily breakable, thereby increasing production efficiency. The resulting electret coarse powder is particularly useful as electrophoretic particles for a large-screen display. The electret coarse powder is also useful as materials for electret fibers, nonwoven fabric, filtering media (filters), vacuum cleaner bags, electret capacitor microphones, and the like.

The fluorine-containing resin sheet is not limited insofar as it serves as an electron trap. Examples of fluorine-containing resin sheets include tetrafluoroethylene-hexafluoro propylene copolymer sheet (FEP), tetrafluoroethylene-perfluoroalkyl vinyl ether copolymer sheet (PFA), polytetrafluoroethylene sheet (PTFE), tetrafluoroethylene-ethylene copolymer sheet (ETFE), polyvinylidenefluoride sheet (PVDF), polychloro trifluoro ethylene sheet (PCTFE), chlorotrifluoethylene-ethylene copolymer sheet (ECTFE) and the like. Among them, at least one member of FEP sheet, PFA sheet, and PTFE sheet is particularly preferable.

The fluorine-containing resin sheet may contain pigment. By containing pigment, color electret coarse powder, which is useful as a material of full-color electronic paper, is obtained. Any known inorganic or organic pigments may be used.

The inorganic pigment is not limited. For example, black pigments containing carbon as a main component, such as carbon black, lamp black, bone black, or botanical black, can be used. As white pigments, titanium oxide, zinc oxide, calcium carbonate, barium sulfate, and silicon oxide can be used. The white pigments are useful for production of white electrophoretic particles or for the adjustment of the specific gravity of the particles.

The organic pigment is not limited. Examples of organic pigments include azo pigments such as β-naphthol-based pigments, naphthol AS-based pigments, acetoacetic acid-based pigments, aryl amide-based pigments, pyrazolone-based pigments, acetoacetic-aryl amide-based pigments, β-naphthol-based pigments, β-oxynaphthoic acid-based pigments (BON acid-based pigments), naphthol AS-based pigments, or acetoacetic acid allylide-based pigments; and polycyclic pigments, such as phthalocyanine-based pigments, anthraquinone-based (threne) pigments, perylene-based or perinone-based pigments, indigo-based pigments, thioindigo-based pigments, quinacridone-based pigments, dioxazine-based pigments, isoindolinone-based pigments, quinophthalone-based pigments, metal complex pigments, methine-based or azo methine-based pigments, diketopyrrolopyrrole-based pigments, or the like. In addition, azine pigments, daylight fluorescent pigments (resin dye solid solution), hollow resin pigments, nitroso pigments, nitro pigments, natural pigments, and the like may also be used.

The organic pigment may be selected from commercial products, such as Symuler Fast Yellow 4GO, Fasdtogen Super Magenta RG, Fasdtogen Blue TGR (DIC Corporation), Fuji Fast Red 7R3300E, Fuji Fast Carmine 527 (Fuji Shikiso K.K.), and the like.

The mean particle diameter of the pigments is preferably about 0.02 to 20 μm, more preferably about 0.02 to 3 μm. The mean particle diameter is found by preparing a 5000-fold-diluted solution of the pigment dispersion diluted with ion-exchanged water, and measuring the median diameter of the diluted solution using a dynamic light scattering particle size distribution measurement device (LB-500: product of HORIBA).

The thickness of the fluorine-containing resin sheet is not limited; however, from the standpoint of efficiency in the process of converting the sheet into an electret sheet or the mean particle diameter of the coarse powder obtained by pulverization, the thickness is preferably 100 to 3000 μm, more preferably 100 to 1000 μm.

The production process of the present invention first irradiates the fluorine-containing resin sheet with an electron beam or a radial ray, thereby converting the fluorine-containing resin sheet into an electret sheet. The conditions for emitting an electron beam or a radial ray are not limited insofar as the fluorine-containing resin sheet is converted into an electret sheet. It is preferable to use an apparatus capable of evenly and simultaneously irradiating the entire sheet with an electron beam or a radial ray from the vertical direction.

The exposure dose is not limited, and is determined depending on the material and thickness of the sheet. For a sheet with a large thickness, the accelerating voltage and the exposure dose are increased so that the entire sheet is more easily converted into an electret sheet. For example, the irradiation is performed by emitting an electron beam of about 10 to 2000 kGy using an electron beam accelerator. In the case of irradiation with a radial ray, a gamma-ray of about 1 to 15 kGy is emitted.

After converting the fluorine-containing resin sheet into an electret sheet, the sheet is pulverized using a pulverizer. The pulverizer is not limited. For example, a known plastic film pulverizer can be used. The mean particle diameter of the obtained coarse powder is preferably, but not limited to, about 0.5 to 3 mm, more preferably about 1 to 2 mm. The coarse powder having the above mean particle diameter ensures a desirable response speed when serving as electrophoretic particles for a large-screen display. Through the above processes, electret coarse powder that is evenly charged to a negative voltage is obtained. The mean particle diameter is an arithmetic mean particle diameter of 10 randomly selected particles that are measured using an optical microscope.

The electret coarse powder is disposed between electrode plates. External voltage application between the electrode plates causes the electret coarse powder to undergo electrophoresis. The electrophoresis medium is not limited. The medium may be air or a liquid. Examples of liquid medium include ethylene glycol (EG), propylene glycol (PG), glycerin, silicone oil, fluorine-containing oil, and petroleum oil. Examples of silicone oil include dimethyl silicone oil and the like. Examples of fluorine-containing oil include perfluoropolyether oil and the like. Among them, silicone oil is particularly preferable.

The electret coarse powder is an atypical powder. Therefore, unlike the existing spherical fine particles that are only capable of dot-based display, the atypical particles are capable of plane-based display. Accordingly, the display area is increased and the gap between each particle of the coarse powder is reduced.

Effect of Invention

The process for producing electret coarse powder according to the present invention is particularly characterized by comprising irradiating a fluorine-containing resin sheet with an electron beam or a radial ray to convert the sheet into an electret sheet, and pulverizing the sheet. This method increases the efficiency of production because the irradiation makes the sheet electret and also makes the sheet fragile, i.e., easily breakable. The resulting electret coarse powder is particularly useful as electrophoretic particles for a large-screen display. The electret coarse powder is also useful as materials for electret fibers, nonwoven fabric, filtering media (filters), vacuum cleaner bags, electret capacitor microphones, and the like.

BRIEF DESCRIPTION OF DRAWINGS

FIG. 1 shows an embodiment of coarse powder obtained by pulverizing an electret PTFE sheet.

EMBODIMENTS

The present invention is more specifically described with reference to the following preparation examples and test examples. However, the present invention is not limited to these examples.

Preparation Examples 1 to 11

After irradiating a fluorine-containing resin sheet with an electron beam to convert the sheet into an electret sheet, the electret sheet was pulverized to prepare electret coarse powder.

Table 1 shows the kinds of fluorine-containing resin sheets, accelerating voltage of the electron beam, radiation quantities, thicknesses of the fluorine-containing resin sheets and mean particle diameter of the coarse powder.

TABLE 1

| | Fluorine-containing resin sheet | Accelerating voltage (V) | Exposure dose (kGy) | Thickness (μm) | Mean particle diameter (μm) |
|---|---|---|---|---|---|
| Preparation Example 1 | PTFE | 800 | 50 | 1000 | 1000 |
| Preparation Example 2 | | | 300 | | |
| Preparation Example 3 | | | 500 | | |
| Preparation Example 4 | | | 1000 | | |
| Preparation Example 5 | | | 2000 | | |
| Preparation Example 6 | FEP | | 500 | 100 | |
| Preparation Example 7 | | | 1000 | | |
| Preparation Example 8 | | | 2000 | | |
| Preparation Example 9 | PFA | | 500 | 100 | |
| Preparation Example 10 | | | 1000 | | |
| Preparation Example 11 | | | 2000 | | |

Test Example 1

Electrophoresis Test

Eleven kinds of electret coarse powder obtained in Preparation Examples 1 to 11 were separately dispersed in a white insulating liquid (silicon oil, KF96L-0.65, Shin-Etsu Chemical Co., Ltd.).

2 cc of each dispersion was wrapped with two 7 cm×7 cm PET films (Mylar 850, 15 to 30 μm in thickness: produced by Teijin) and the four corners of the layered films were sealed by heating. The entire thickness was 0.5 to 14 μm. Eleven kinds of sample electret coarse powder dispersions were obtained.

For comparison, another eleven samples were prepared with no electron ray irradiation.

Each end of the samples and the comparative samples was clipped to a terminal of a high voltage power supply. 2000V was applied across the clips on both ends, and electrophoresis was observed. The samples processed into electret particles underwent regular electrophoretic migration at high speed, and all particles were moved to the positive electrode. In contrast, the samples of non-electret particles underwent irregular electrophoretic migration, and the particles were separated to the positive electrode and the negative electrode.

The invention claimed is:

1. A process for producing electret coarse powder, comprising irradiating a fluorine-containing resin sheet with an electron beam or a radial ray to convert the fluorine-containing resin sheet into an electret sheet, and pulverizing the electret sheet.

2. The process according to claim 1, wherein the electret coarse powder has a mean particle diameter of from 0.5 to 3 mm.

3. The process according to claim 2, wherein the electret coarse powder contains a pigment.

4. The process according to claim 1, wherein the electret coarse powder contains a pigment.

5. The process according to claim 1, wherein the fluorine-containing resin sheet is at least one member selected from the group consisting of tetrafluoroethylene-hexafluoropropylene copolymer sheets (FEP), tetrafluoroethylene-perfluoroalkylvinylether copolymer sheets (PFA) and polytetrafluoroethylene sheets (PTFE).

6. The process according to claim 5, wherein the electret coarse powder has a mean particle diameter of from 0.5 to 3 mm.

7. The process according to claim 6, wherein the electret coarse powder contains a pigment.

8. The process according to claim 5, wherein the electret coarse powder contains a pigment.

* * * * *